United States Patent Office

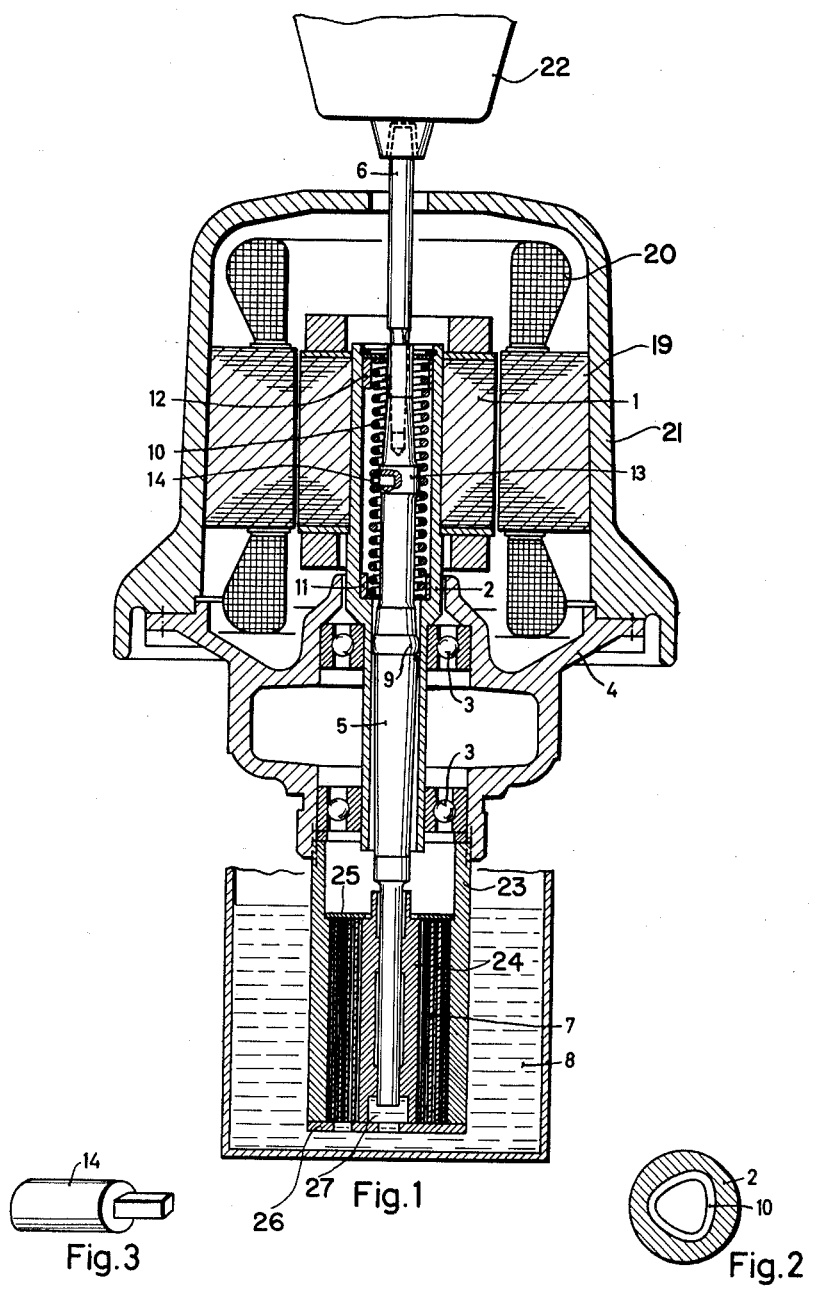

3,158,767
Patented Nov. 24, 1964

3,158,767
ELECTRIC SPINNING-POT MOTOR
Rudolf Schöning, Bad Neustadt an der Saale, Germany, assignor to Siemens-Schuckertwerke Aktiengesellschaft, Berlin - Siemensstadt, Germany, a corporation of Germany
Filed May 9, 1961, Ser. No. 108,834
Claims priority, application Germany, May 17, 1960, S 68,546
7 Claims. (Cl. 310—75)

My invention relates to electric spinning-pot motors as used for the spinning of filaments from rayon and other synthetic materials. More particularly, the invention concerns itself with a spinning-pot motor whose rotor shaft extending vertically, is tubular and is traversed by an inner vertical shaft which carries the spinning pot on its upper portion protruding out of the hollow shaft, the inner shaft being resiliently displaceable within some limits relative to the hollow rotor shaft and being preferably connected with vibration damping means in order to take care of any vibrations due to unbalance of the spinning pot or of the material contained therein. Spinning-pot motors of this type are disclosed in the copending application of Schönwald Serial No. 108,833, filed May 9, 1961, entitled "Electric Spinning-Pot Motor" and assigned to the assignee of the present invention. In such spinning-pot motors a coupling structure is mounted between the hollow rotor shaft and the inner shaft in order to transmit the driving torque from the hollow shaft to the inner shaft. It is further necessary to provide return-spring means tending to hold the inner shaft in a given centered position relative to the hollow shaft. In some cases, a separate axial bearing for the inner shaft is also required.

It is an object of my invention to simplify considerably the construction of such spinning-pot assemblies and to increase accordingly the reliability of operation as well as reduce the manufacturing cost.

To this end, and in accordance with a feature of my invention, a spinning-pot motor having a hollow rotor shaft and a pot-carrying inner shaft that is displaceable but torque-coupled with the hollow shaft, is provided with a helical spring which furnishes the elastic return force for centering the inner shaft and which simultaneously serves as a coupling between hollow shaft and inner shaft for transmitting the driving torque to the latter. In this manner, the need for a torque-transmitting coupling device in addition to a return spring is eliminated.

According to another, more specific feature of my invention, the above-mentioned helical spring is preferably given a non-circular perimeter or over-all cross section, and the two ends of the elongated helix are seated in recesses or against shoulders of the hollow shaft whose seating areas having the same, or approximately the same, contour as the ends of the spring.

According to another feature, the inner shaft is provided with one or more annular bulges or the like structural elements which have an outer perimeter equal or similar to that of the helical spring, these bulges or thickening structures being located substantially mid-way between the above-mentioned recesses or shoulders of the hollow shaft. The bulges form a torque-transmitting connection of the inner shaft with the spring and thereby also with the hollow shaft, while nevertheless permitting the inner shaft to perform elastic axial as well as radial or angular displacements relative to the hollow shaft.

According to still another feature of my invention, the need for an additional axial bearing of the inner shaft is eliminated by providing the inner shaft with one or more transverse pins which engage the helical spring, so that the spring also serves to carry the inner shaft with the spinning pot.

The foregoing and more specific features of my invention will be described with reference to the embodiment fo a spinning-pot motor according to the invention illustrated by way of example in the accompanying drawing, in which:

FIG. 1 is an axial, vertical section of the spinning-pot motor of the present invention;

FIG. 2 is a top view onto the helical coupling and biasing spring; and

FIG. 3 is a perspective view of a coupling pin which forms part of the motor assembly.

The illustrated motor comprises a laminated rotor 1 mounted on a hollow shaft 2. The laminated stator 19, surrounding the rotor 1 and carrying the electric excitation coils 20, is mounted coaxially within the upper portion of a housing 21 flanged together with the lower portion 4 of the housing. The hollow shaft 2 is vertically journalled in the housing portion 4 by means of two ball bearings 3. The hollow shaft is traversed by an inner shaft with sufficient radial clearance to permit axial and radial or angular displacement of the inner shaft relative to the hollow shaft. The inner shaft is composed of a lower portion 5 and an upper portion 6. The upper portion 6 carries the spinning-pot 22 and is frictionally stuck together with the lower shaft portion 5. The upper portion 6 of the inner shaft protrudes upwardly out of the hollow shaft 4. The lower shaft portion 5 extends downwardly below the hollow shaft and has its lower end provided with a damping device. The particular design and operation of the damping device is not essential to the present invention proper. The one illustrated in FIG. 1 corresponds to the damping device according to the above-mentioned copending application and comprises an oil-filled container 8 and a mounting cylinder 23 coaxially joined with the housing portion 4 by threaded engagement therewith, a glide bearing 24 in which the end of the shaft portion 5 is journalled but axially displaceable, and a gap-type damping assembly 7 consisting of a number of coaxially nested hollow cylinders with intermediate annular gaps filled with damping oil, or of a spiral which forms a continuous spiral-shaped gap around the bearing structure 24. The bearing structure 24 and the gap structure 7 are mounted on the cylinder 23 by means of discs 25 and 26 which are coaxially fastened to the cylinder 23. The disc 26 has openings through which the oil from container 8 can enter into the gaps as well as into a chamber 27 in which the lower end of the inner shaft forms a plunger. During operation, the damping device attenuates radial oscillations of the inner shaft relative to the cylinder 23 and hence relative to the hollow rotor shaft. The device also damps axial vibrations, due to the fact that axial displacements cause a volumetric change in the chamber 27.

The inner shaft is centered in the hollow shaft 2 by means of a bulge 9 of rounded or spherical contour which peripherally engages the hollow shaft 2 and thereby defines a location on the hollow shaft axis about which the inner shaft is angularly movable in all directions under the effect of oscillations caused by the spinning-pot. An elongated helical spring 10 surrounds the inner shaft 5 within the hollow shaft 2. The spring serves to return the inner shaft to the normal centered position of rest in which the inner shaft is coaxially positioned relative to the hollow shaft. The upper and lower ends respectively of the helical spring are firmly seated in the hollow shaft 2. The two seating areas are axially spaced from each other sufficiently to permit lateral bending of the helical spring.

In order to employ the helical spring simultaneously as a torque-transmitting coupling, its two ends must be firmly and torque-transmittingly joined with the hollow shaft 2. For this purpose, in the illustrated embodiment, the helical spring, or at least its end portions, are given a non-circular perimeter or cross section as illustrated, for example, in FIG. 2. The ends of the spring 10 are seated in respective rings 11 and 12 which are rigidly joined with the hollow shaft 2 and whose respective bores are likewise non-circular in accordance with the cross section of the spring. The inner shaft 5 is provided with a peripheral bulging portion which is likewise non-circular in accordance with the cross section of the spring at this location. Consequently, the helical spring 10 is not rotatable relative to the hollow shaft 2 nor relative to the inner shaft 5 or its shoulder portion 13. In this manner, the helical spring operates as a torque-transmitting coupling between the two shafts in addition to performing its centering function.

The shoulder portion 13 of the inner shaft 5 is provided with one or more transverse pins 14 whose protruding end enters between two adjacent turns of the helical spring 10. As a result, the helical spring has the further function of vertically supporting and carrying the inner shaft, thus eliminating the necessity of using an axial shaft bearing for this purpose. Any suitable number of such pins 14 may be provided. The pin 14 can be screwed into the shoulder portion 13 of the shaft. However, the pin may simply be seated in a bore of the hollow shaft if the inner, seated portion of the pin 14 is given a greater diameter than the outwardly protruding pin portion that is located between the turns of the helical spring. The spring then prevents the pin or pins from being flung out of their seats by centrifugal force.

It will be understood that other cross-sectional shapes of the spring and of the corresponding seating areas may be used instead of the one shown in FIG. 2, and that, if a spring of circular cross section is employed, it must likewise be torque-transmittingly fastened to the hollow shaft as well as to the inner shaft substantially in the manner and for the purposes described above.

Such and other modifications will be obvious to those skilled in the art upon a study of this disclosure, without departing from the essential features of my invention and within the scope of the claims annexed hereto.

I claim:
1. Electric spinning-pot motor comprising a vertical hollow rotor shaft, an inner shaft extending with radial clearance through said hollow shaft and having an upper portion protruding upwardly from said hollow shaft for supporting a spinning-pot, said inner shaft being displaceable in non-peripheral directions relative to said hollow shaft, an axially elongated helical spring surrounding said inner shaft within said hollow shaft, said spring having its ends torque-transmittingly joined with said hollow shaft at respective locations axially spaced from each other, said spring having a middle portion torque-transmittingly joined with said inner shaft and being laterally bendable between said two locations, whereby said spring forms an elastic centering means for said inner shaft as well as a coupling for transmitting torque to said inner shaft.

2. In a spinning-pot motor according to claim 1, said spring having a non-circular cross section, said hollow shaft having a mating non-circular inner cross section at said two locations, and said inner shaft having a mating non-circular cross section at said middle portion of said spring.

3. A spinning-pot motor according to claim 2, comprising two rings coaxially seated in said hollow shaft and rigidly joined therewith at said respective locations to form part thereof, said rings having said inner non-circular mating cross section and being engaged by said respective ends of said spring.

4. In a spinning-pot motor according to claim 2, said spring having a cross section symmetrical in three radial directions equally spaced angularly from each other.

5. A spinning-pot motor according to claim 1, comprising pin means radially protruding from said inner shaft and extending between adjacent turns of said helical spring, whereby said inner shaft is elastically carried by said spring.

6. In a spinning-pot motor according to claim 1, said inner shaft having a shoulder portion joined with said spring at said middle portion of said spring, said shoulder portion having a diameter larger than the diameter of said inner shaft between said shoulder portion and said respective two locations, and pin means inserted into said shoulder portion and radially protruding therefrom between adjacent turns of said helical spring, whereby said inner shaft is elastically carried by said spring.

7. In a spinning-pot motor according to claim 6, said shoulder portion having a radial bore, said pin means comprising a pin seated in said bore and having a diameter larger than the spacing between said adjacent turns of said helical spring, and said pin having between said turns a width smaller than said diameter, whereby said spring retains said pin in said bore in opposition to centrifugal force.

References Cited by the Examiner

UNITED STATES PATENTS 2,734,359   2/56   Mulheim _____ 310—75.4

FOREIGN PATENTS 949,719   2/49   France.

MILTON O. HIRSHFIELD, *Primary Examiner.*
DAVID X. SLINEY, *Examiner.*